United States Patent [19]

Kuwabara et al.

[11] Patent Number: 4,823,018
[45] Date of Patent: Apr. 18, 1989

[54] CONTROL SYSTEM FOR VARIABLE SPEED WATER-WHEEL GENERATOR APPARATUS

[75] Inventors: Takao Kuwabara; Akira Bando, both of Hitachi; Eiji Haraguchi, Ibaraki; Hiroto Nakagawa, Mishima, all of Japan

[73] Assignee: Hitachi Ltd., Tokyo, Japan

[21] Appl. No.: 46,725

[22] Filed: May 7, 1987

[30] Foreign Application Priority Data

May 12, 1986 [JP] Japan .................. 61-106641

[51] Int. Cl.$^4$ .............. F02D 29/06; F01D 15/10
[52] U.S. Cl. .................. 290/7; 290/40 C; 290/40 A; 290/43; 290/54
[58] Field of Search ............. 290/7, 40 B, 40 C, 42, 290/40 A, 43, 54

[56] References Cited

U.S. PATENT DOCUMENTS

| 3,810,717 | 5/1974 | Rakcevic | 417/323 |
| 4,344,025 | 8/1982 | Okuyama et al. | 318/729 |
| 4,481,455 | 11/1984 | Sugimoto et al. | 318/778 |
| 4,625,125 | 11/1986 | Kuwabara | 290/52 |
| 4,694,189 | 9/1987 | Haraguchi et al. | 290/40 C |
| 4,708,594 | 11/1987 | Shinmei et al. | 417/53 |
| 4,743,827 | 5/1988 | Shiozaki et al. | 318/798 |
| 4,754,156 | 6/1988 | Shiozaki et al. | 290/52 |

FOREIGN PATENT DOCUMENTS 59-72998 4/1984 Japan .

Primary Examiner—William M. Shoop Jr.
Assistant Examiner—Sharon D. Logan
Attorney, Agent, or Firm—Fay, Sharpe, Beall, Fagan, Minnich & McKee

[57] ABSTRACT

A control system for a variable speed water turbine generator apparatus includes a first function generator that is responsive to an output command signal. The first function generator produces a rotation number command signal. A speed adjuster produces an output signal in accordance with a different signal between the first function generator output and an actual rotation number. An adder adds the generator output command signal to the speed adjuster output signal to determine an overall output command signal. An output adjuster produces an output signal in accordance with a difference between the adder output and an actual power output of the generator for controlling the firing angles of the frequency converter. A second function generator, responsive to the generator output command signal, determines an opening command signal for the variable opening vanes. An opening adjuster produces an output signal in accordance with a difference signal between the second function generator output and an actual opening of the variable opening vanes to control the variable opening vanes. The first and second function generators increase command values for the rotation number and the variable opening vanes, respectively, as the output command signal increases. The frequency converter is further controlled to maintain the rotation number within a predetermined operation range.

8 Claims, 4 Drawing Sheets

CONTROL SYSTEM FOR VARIABLE SPEED WATER-WHEEL GENERATOR APPARATUS

BACKGROUND OF THE INVENTION

This invention relates to a control system for a variable speed water turbine generator apparatus.

A water turbine generator apparatus, conventionally well known and adopted, uses a synchronous machine as a generator and therefore the frequency of generation output has a proportional relationship with the rotation number of the generator. Conversely, in a variable speed generator, the rotation number can be controlled to a value which is separate from and independent of the frequency of generation output and so, the rotation number of a water turbine can advantageously be controlled to a value at which efficiency of the water turbine is maximized while maintaining the generation output frequency at a frequency of an electric power system.

A control system for this type of variable speed water turbine generator apparatus, such as illustrated in FIG. 1 of the present application, has been proposed in, for example, JP-A-57-182920.

Referring to FIG. 1, a wound-rotor induction generator 1 is driven for rotation by means of a water turbine 2 directly connected to the rotor of the generator. The generator 1 is driven at variable speeds while a secondary winding 1b of the generator 1 being supplied with an AC exciting current which is so adjusted, by means of a cyclo-converter 3, as to have a predetermined internal phase difference angle in accordance with a rotation speed of the generator 1, so that AC power of a constant frequency equal to a rated frequency of an electric power system 4 may be generated from a primary winding 1a of the generator 1. A water turbine characteristic function generator 5 is supplied with a rotation speed signal N, a generation output command Po applied externally and a water-level detection signal H and generates an optimum rotation speed command Na and an optimum guide vane opening command Ya which are used for operating the generator apparatus at maximum efficiency. An induction machine 7 for slip phase detection has a rotor directly coupled to the generator 1 and a primary winding 7a connected to the output of the generator 1 and it delivers a slip phase signal Sp through a secondary winding 7b. The slip phase signal Sp and optimum rotation speed command Na are applied to a control unit (not shown) included in the cyclo-converter 3 in order for the cycloconverter 3 to control the frequency and internal phase difference angle of the AC exciting current supplied to the secondary winding 1b of the generator 1, in the manner described above. The optimum guide vane opening command Ya is applied to a guide vane driver 8 which in turn controls the opening of guide vanes 9 such that a waterwheel output $P_T$ can be optimized.

In the variable water turbine generator apparatus, it is required that the generation output be rendered coincident to a generation output command issued from, far example, a central load-dispatching office, and the rotation speed of the water turbine and the guide vane opening be controlled to proper values under that generation output, whereby the water turbine can be operated at maximum efficiency under that generation output. To this end, two operation terminals are adjustable which are represented by the cyclo-converter 3 operative to effect excitation control, such as frequency and internal phase difference angle control, for the rotor and by the guide vane operating of the water wheel. Importantly, it should therefore be decided what control items are to be shared by respective operation terminals in realizing a control system. The known reference, however, fails to provide sufficient disclosure in this regard. Especially, where a generation output control mode is provided independently of the aforementioned optimum rotation speed control mode and optimum guide vane control mode so that three control modes are involved, the prior art has absolutely failed to clarify a way of allotting the three control modes to the two operation terminals and compatibly applying thereto those control modes in combination.

Further, in the known reference, the response speed in the rotation speed optimizing control is retarded relative to the response speed in the guide vane optimizing control to prevent the water wheel from transiently coming into a specified bad operation or running condition range. However, on the other hand, there is a possibility that the slower response speed in the rotation speed optimizing control causes the rotation speed to overshoot and transiently go beyond a predetermined permissible variable speed band. This means that the possibility of step-out is disadvantageously increased.

SUMMARY OF THE INVENTION

In view of the above, the present invention intends to solve the problems encountered in the prior art and has for its object to provide a variable speed generator apparatus which can rotationally achieve the generation output control, rotation speed optimizing control and guide vane opening optimizing control at a time and can ensure stable operations within a permissible variable speed band.

According to the invention, the above object can be accomplished by a control system for a variable speed water turbine generator apparatus comprising a generation output detector for detecting a generation output from a variable speed generator; a water turbine characteristic function generator for receiving a signal indicative of a water level which is detected as being applied to the water turbine and a generation output command signal and for producing an optimum rotation speed command and an optimum guide vane opening signal. Further the control system includes a unit for receiving a difference between the optimum rotation speed command signal and a signal indicative of a detected actual rotation speed and for operating to make the difference zero; a power control unit for comparing a composite signal of an output signal from the computing unit and the generation output command signal with an actual generation output signal detected by the generation output detector to produce a comparison difference and for controlling an AC exciting current supplied to the variable speed generator such that the comparison difference is made zero. Also, a rotation variation suppressing circuit is included with the control system for generating a signal in a direction in which a variation of the actual rotation speed is suppressed when the actual rotation speed tends to very beyond a predetermined permissible variation range, with the output signal from the suppressing circuit being applied to the composite signal.

BRIEF DESCRIPTION OF THE DRAWINGS

FIG. 5 is a block diagram illustrating a control system according to another embodiment of the invention.

DESCRIPTION OF THE PREFERRED EMBODIMENTS

Figure 1:
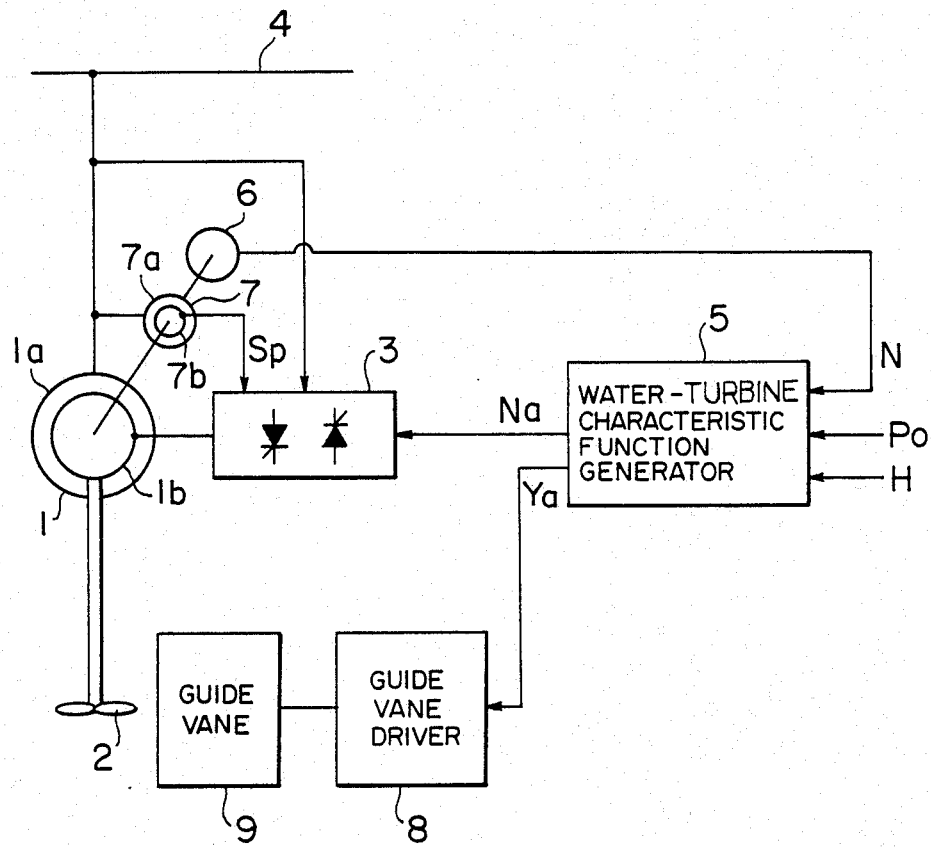
FIG. 1 is a block diagram illustrating a prior art variable speed water-turbine generator apparatus and control system therefor.
Figure 2:
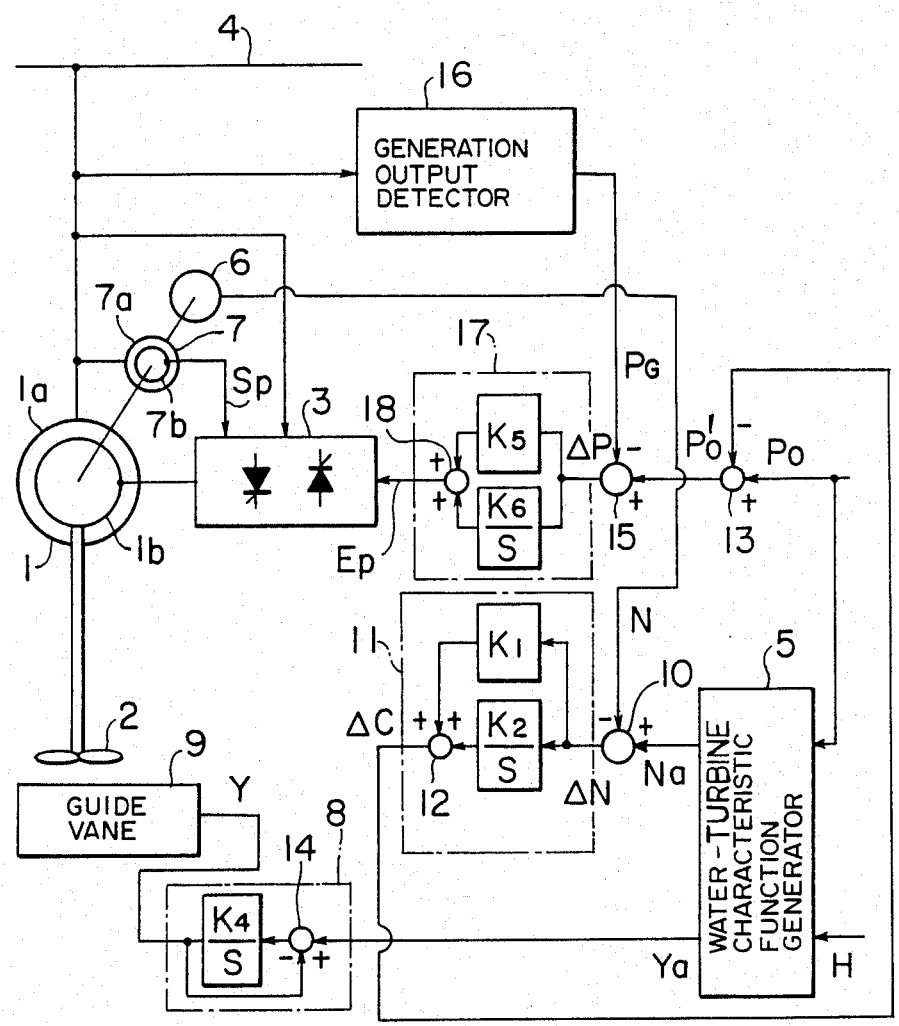
FIG. 2 is a block diagram illustrating a control system for a variable speed water turbine generator apparatus according to an embodiment of the invention.

Referring now to FIG. 2, there is illustrated, in block form, a control system according to an embodiment of the invention. In FIG. 2, components like those in FIG. 1 are designated by like reference numerals.

A water turbine characteristic function generator 5 receives a generation output command Po and a water-level detection signal H and generates an optimum rotation speed command Na and an optimum guide vane opening command Ya. A comparator 10 compares the optimum rotation speed command Na with an actual rotation speed signal N detected by a rotation speed detector 6 to produce a difference $\Delta N$ ($=Na-N$) which in turn is applied to a computing unit 11. The computing unit 11 includes a proportional element $K_1$, an integration element $K_2/S$ and an adder 12 and produces a correction signal $\Delta C$ which corrects the generation output command Po such that the difference $\Delta N$, unless null, is made zero. Thus, the correction signal $\Delta C$ is added at an adder 13 to the externally supplied generation output command Po to produce an ultimate generation output command Po' that is supplied to a comparator 15.

The optimum guide vane opening command Ya is applied to a guide vane driver 8. The guide vane driver 8 includes an adder 14 and an integration element $K_4S$ whose output signal is negatively fedback to the adder 14.

The comparator 15 compares the ultimate generation output command Po' applied as one input thereof with an actual generation output signal $P_G$ detected by a generation output detector 16 and applied as the other input and produces a difference $\Delta P$ ($=Po'-P_G$) which in turn is supplied to a power control unit 17. The power control unit 17, comprised of a proportional element $K_5$, an integration element $K_6/S$ and an adder 18, produces an output signal Ep applied to a cyclo-converter 3. The cyclo-converter 3 includes an automatic pulse-phase shifter (not shown) operable under the application of a slip phase signal Sp extrcted from a secondary winding 7b of a slip-phase detection induction machine 7 and the output signal Ep from the power control unit 17 and is operative to control firing angles of semiconductor devices such as thyristors so as to adjust electric power supplied to a secondary winding 1b of a wound-rotor induction generator 1. The remaining parts identical to those of the FIG. 1 system need not be described herein.

Figure 3A:
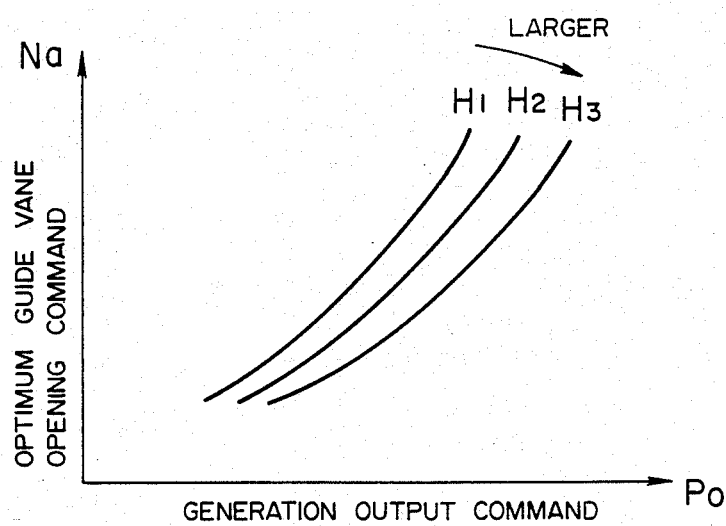
FIGS. 3A and 3B graphically illustrate characteristics of a water-wheel characteristic function generator shown in FIG. 2.
Figure 3B:
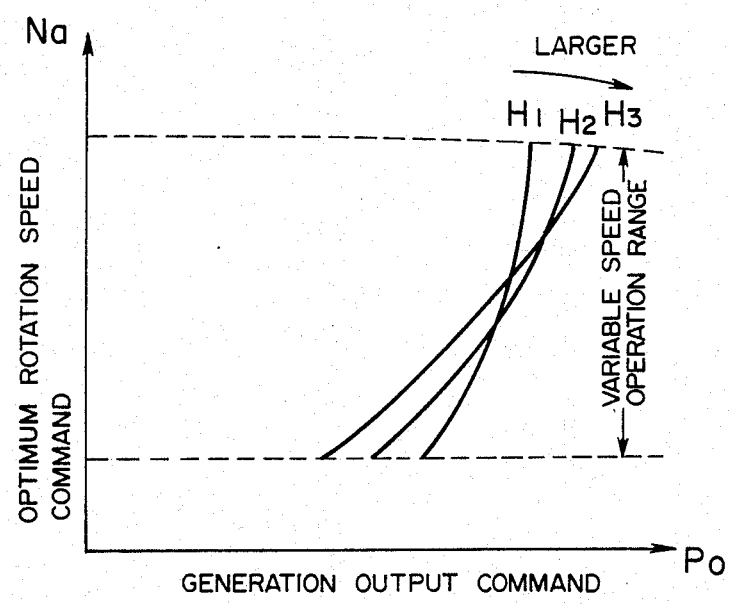

The water turbine characteristic function generator 5 in FIG. 2 adapted to obtain the optimum rotation speed command Na and the optimum guide vane opening command Ya has characteristics as shown in FIGS. 3A and 3B. More particularly, FIG. 3B shows that for a constant head H, the optimum rotation speed command Na is increased to provide higher speeds as the generation output command Po increases but should be confined within a range defined by permissible upper and lower limits for variable speed operatins of the water turbine. FIG. 3A shows that for a constant head H, the optimum guide vane opening command Ya is increased to provide larger openings as the generation output command Po increases and that for a constant Po, the Ya is increased to provide larger openings as the head H decreases, where $H_1 < H_2 < H_3$. The function generator 5 is supplied with both the generation output command Po and head H but in the case of a water power station in which the head will not vary by itself to a great extent, the function generator may conveniently determine an optimum guide vane opening command Ya and an optimum rotation speed command Na under the application of only a generation output command Po. When the generation output command Po is increased, the water turbine characteristic function generator 5 operates to increase the Ya and Na as described above. In this operation, responses occur in the control system of FIG. 2 as will be described below.

Figure 4:
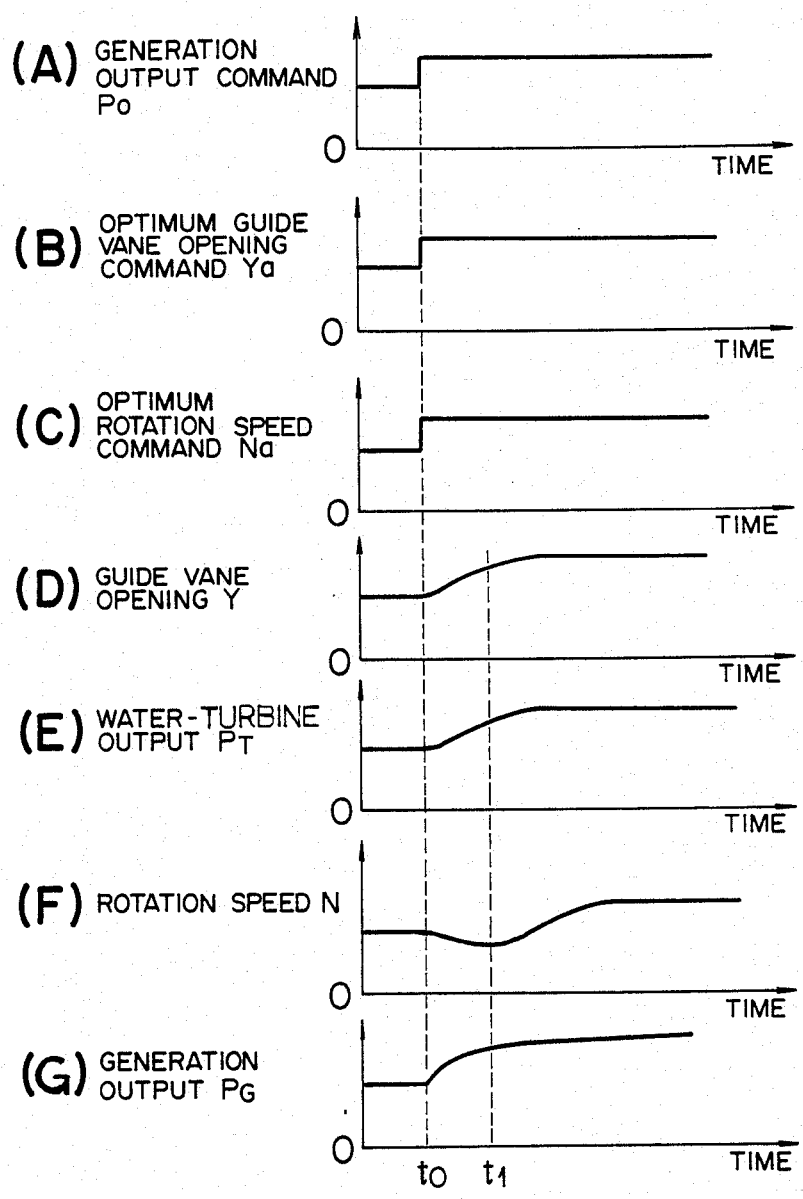
FIG. 4 illustrates, at sections (a) through (g), responses occurring in the FIG. 2 system when the generation output command (Po) is increased.

Specifically, when the generation output command Po is increased stepwise as illustrated at section (a) in FIG. 4 in order to increase the generation output $P_G$, for example, stepwise at time $T_o$, the generation output $P_G$ of the generator 1 is caused to increase to follow a variation in the generation output command Po but in this phase, the ultimate generation output command Po' is smaller than the generation output command Po as will be clarified later and consequently an increased generation output $P_G$ is below the Po as illustrated at section (g) in FIG. 4. The ultimate generation output command Po' is processed by the integration element $K_6/S$ in power control unit 17 cooperative with a negative feedback circuit comprised of the power control unit 17, cyclo-converter 3, generator 1, generation output detector 16 and comparator 15, so that the difference $\Delta P$ ($=Po'-P_G$) is gradually decreased to finally establish $P_G = Po'$. On the other hand, the response of opening Y of the guide vane 9 shown at (d) in FIG. 4 as it changes to the optimum guide vane opening command Ya shown at (b) in FIG. 4 is slower than the response of the generation output $P_G$ as it changes to the ultimate generation output command Po'. Accordingly, water turbine output $P_T$ is initially increased more slowly than the generation output $P_G$ as illustrated at (e) in FIG. 4, with the result that as shown at (f) in FIG. 4, the rotation speed N is temporarily decelerated after the abrupt change of the generation output command Po until it (N) thereafter stops decreasing at time $t_1$ so that the water turbine output $P_T$, which is increasing as the guide vane opening Y increases substantially reflects the generation output $P_G$ which has been raised earlier than the $P_T$. Since at time $t_1$ the actual rotation speed N is lower than the optimum rotation speed command Na shown at (c) in FIG. 4, providing a positive difference $\Delta N$ ($=Na-N$) and consequently a positive correction signal $\Delta C$ delivered out of the computing unit 11, an ultimate generation output command $Po'=Po-\Delta C$ corrected by this positive correction signal $\Delta C$ becomes smaller than the generation output command Po, thus producing an actual generation output $P_G$ which is slightly smaller than the generation output command Po. After time $t_1$, the guide vane opening Y continues to increase until it reflects the generation output command Po and consequently, the difference between waterwheel output $P_T$ and generation output $P_G$ grows to increase the rotation speed N until it approaches the optimum rotation speed command Na along with concurrent approach of the correction signal $\Delta C$ to zero, whereby eventually the ultimate generation output command coincides with the generation output command Po and the rotation speed N equals the optimum rotation speed command Na. Specifically, the difference $\Delta N$ ($=Na-N$) is gradually decreased to reach the stationary condition of $N = Na$ by means of the integration element $K_2/S$ in computing unit 11 cooperative with a negative feedback circuit comprised of the computing unit 11, adder 13, comparator 15, power control unit 17, cyclo-converter 3, generator 1, rotation speed detector 6 and comparator 10. The opening Y of the guide vane 9 is controlled through a negative feedback circuit comprised of the integration element $K_4/S$ and adder 14 included in the guide vane driver 8 such that $Ya-Y=0$ is eventually settled, which means that Y is brought into coincidence with Ya.

In the above operation, it is preferred that the proportional gain $K_1$ and the integration gain $K_2$ be chosen such that the response of the computing unit 11 to $\Delta N$ ($=$optimum rotation speed command Na - rotation speed N) is much slower than the response of the generation output $P_G$ to the ultimate generation output command Po' and the response of the actual guide vane opening Y to the optimum guide vane opening command Ya.

Incidentally, when a large generation output command is applied or when a generation output command is additionally changed under a condition that the rotation speed has already deviated considerably from an optimum value during the preceding transient phenomenon still persisting, the rotation speed transiently varies to a great extent due to the fact that the response speed in the rotation speed optimizing control is slower as described previously and in extremities, there is a possibility that the rotation speed goes beyond the upper limit or the lower limit of a permissible variable speed operation band admitted by the cyclo-converter. This problem can be dealt with by another embodiment of the invention as illustrated in FIG. 5. In this embodiment, there is additionally provided a power modifying signal function generator 21 adapted to produce a positive generation output modifying signal where the rotation speed N increases by $\Delta N_1$ in excess of a synchronous speed corresponding to zero slip and conversely, a negative generation output modifying signal when the rotation speed N falls by $\Delta N_2$ below the synchronous speed. The output signal, i.e., power modifying signal $\Delta D$ is also combined with the correction signal $\Delta C$ so as to be reflected in the ultimate generation output command Po'.

Thus, when the rotation speed N tends to increase beyond the variable speed band, the Po' or the generation output $P_G$ is increased to decrease the rotation speed, thereby suppressing an excessive increase in the rotation speed.

Conversely, when the rotation speed N tends to decrease beyond the variable speed band, the Po' is decreased, consequently, the generation output $P_G$ is decreased to increase the rotation speed, thereby suppressing an excessive decrease in the rotation speed.

In this manner, the rotation speed N can steadily be confined within the variable speed band.

As described above, according to the present invention, the generatio output control, rotation speed optimizing control and guide vane opening optimizing control can all be performed compatibly at a time and stable variable speed operations within the permissible variable speed band can be ensured.

We claim:

1. A control system for a variable speed water turbine generator apparatus including a generator having a primary winding connected to an electric power system and a secondary winding connected to said electric power system through frequency converter means, and a water turbine directly coupled to a shaft of said generator and having variable opening vanes, said control system comprising:

a first function generator responsive to at least an output command signal for said variable speed water turbine generator apparatus for producing a rotation speed command signal;

speed adjuster means for producing an output signal in accordance with a signal indicative of a difference between the rotation speed command signal of said first function generator and an actual rotation speed;

an adder for adding the output command signal for said variable speed water turbine generator apparatus to the output signal of said speed adjuster means to determine an overall output command signal;

output adjuster means for producing an output signal in accordance with a signal indicative of a difference between the overall command output signal of said adder and actual power of said generator, and means receiving the output signal of said output adjuster means for controlling the firing angle of said frequency converter means;

a second function generator responsive to at least the output command signal for said variable speed water turbine generator apparatus for producing an opening command signal for the variable opening vanes of said water turbine; and opening adjuster means for producing an output signal in accordance with a signal indicative of a difference between the output signal of said second function generator and an actual opening of the variable opening vanes of said water wheel, and means receiving the output signal of said opening adjuster means for controlling the opening of said variable opening vanes.

2. A control system according to claim 1 wherein said first and second function generators increase command values for the rotation speed and the variable opening vanes, respectively, as said output command signal increases.

3. A control system according to claim 1 further comprising means for controlling said frequency converter means such that the rotation speed tending to go beyond a predetermined operation range is confined within said predetermined operation range.

4. The control system for a variable speed water turbine generator apparatus as claimed in claim 1, further comprising:

means for modifying said overall output command signal when the rotation speed deviates from a predetermined range, including means for producing a modifying signal and means for adding said modifying signal to said overall output command signal for increasing said overall output command signal when said rotation speed exceeds said predetermined range and for decreasing said overall output command signal when said rotation speed fall short of said predetermined range.

5. The control system according to claim 4, wherein said means for adding includes an adder for adding said output of said modifying signal to said output signal of said speed adjuster means and wherein said modifying means is a function generator.

6. A control system for a variable speed water turbine generator apparatus having a frequency converter connected to an electric power system and being operated at a synchronous frequency with said electric power system for power generation, said turbine generator apparatus being driven by a water turbine having variable opening vanes and having means for selectively adjusting its running speed according to its operating conditions, said control system comprising:

means for producing a desired generation output command signal;

an actual generation output detector;

means for producing a desired rotation speed command signal;

an actual rotation speed detector;

speed control means for comparing said desired rotation speed command signal with an output of said actual rotation speed detector to determine a rotation speed difference and for producing an output signal controlling actual rotation speed based on said difference to meet said desired rotation speed command signal;

means for combining said output signal of said speed control means and said desired generation output command signal to produce a composite output command signal;

power control means for comparing said composite generation output command signal with an output of said actual generation output detector and for controlling the actual output of said generator such that the desired generation output command signal and desired rotation speed command signals are met; and means for controlling said variable opening vanes of said water turbine.

7. The control system according to claim 6, further comprising:

composite output command signal modifying means for modifying said composite output command signal when the rotational speed deviates from a predetermined range, including means for producing a modifying signal and for adding said modifying signal to said composite output command signal such that said composite command signal is increased when said rotation speed exceeds said predetermined range and said composite command signal decreases when said rotation speed falls short of said predetermined range.

8. The control system according to claim 7, wherein said means for adding comprises an adder for adding the modifying signal to the output of said speed control means and wherein said modifying means is a function generator.

* * * * *